Oct. 27, 1970     A. M. PAOLONI     3,536,496
METHOD OF MAKING LIQUID COFFEE CONCENTRATE
Filed Dec. 18, 1967
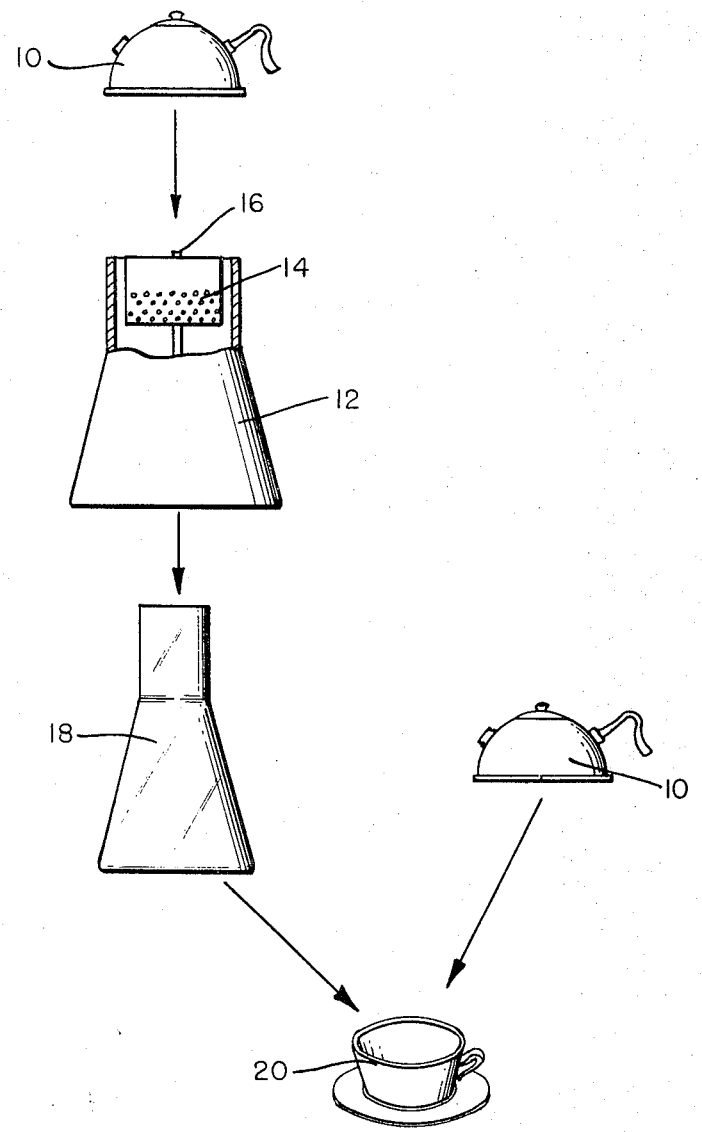
INVENTOR
Armand M. Paoloni
BY Alexander B. Blair
ATTORNEY

United States Patent Office 3,536,496
Patented Oct. 27, 1970

3,536,496
METHOD OF MAKING LIQUID COFFEE CONCENTRATE
Armand M. Paoloni, 2525 Warrego Way, Sacramento, Calif. 95826
Filed Dec. 18, 1967, Ser. No. 691,446
Int. Cl. A23f 1/08
U.S. Cl. 99—71      1 Claim

ABSTRACT OF THE DISCLOSURE

A quantity of ground coffee is placed in a basket or the like in a container, and a quantity of boiling water, substantially less than would be required for potable coffee, is poured periodically, and not all at one time, into the basket, resulting in the formation of the liquid coffee concentrate in the container. The concentrate may then be bottled and stored in the refrigerator, and a potable cup of coffee is made by using a given amount of concentrate in a cup and adding boiling water thereto to fill the cup.

BACKGROUND OF THE INVENTION

The invention relates to the making of a liquid concentrate to be diluted as needed to make a potable drink. The prior art discloses drip coffee makers wherein a quantity of ground coffee is placed in a container and the amount of water necessary to make a potable coffee is poured, after being boiled, over the coffee and allowed to drip downwardly into a container from which it is directly poured into cups and consumed. When coffee is so made, or made by other well known methods, for example, by percolation, it is necessary to wash the coffee pot and the ground coffee holder after each use. It is also the common practice, for convenience, to make coffee by conventional methods and then evaporate the water to leave a dried, soluble powdered coffee. With this method, the desired amount, for example, a teaspoonful of powdered coffee, is placed in a cup and boiling water poured thereover. It is well known that powdered coffee does not give the finished coffee the same flavor and aroma that is present in conventionally made coffee from ground beans.

SUMMARY OF THE INVENTION

The present invention involves a method of making neither directly a potable coffee nor a dried coffee but a liquid coffee concentrate, only a relatively small quantity of which is used for each cup of coffee. It is preferred that a relatively substantial amount of the concentrate be made so that many cups of coffee can be prepared therefrom as easily as a cup of coffee can be made by the use of powdered coffee.

A quantity of ground coffee is placed in a basket which may be similar to the basket of a conventional percolator pot. The basket need not be of any desired form or material as long as it permits water to drip through the ground coffee. The basket is placed in a suitable pot and a quantity of water, substantially less than would be required for making coffee for direct consumption, is placed on the stove and boiled. For example, four cups of ground coffee may be placed in the percolator basket and eight cups of water will be brought to a brisk boil. Two cups of the boiling water are then poured over the ground coffee in the basket and permitted to seep through the coffee into the container. This procedure is repeated at intervals until all of the eight cups of boiling water have been poured over the coffee grounds. It is preferred that an interval of between ten and fifteen minutes be allowed between the pouring of each quantity of water over the ground coffee and it has been found that the best results are obtained by pouring the water over the coffee at intervals of thirteen minutes. The total quantity of water used and the amount poured over the ground coffee each time is not critical and may be varied, and after all of the water has been poured over the ground coffee and drained therethrough, the resultant liquid in the bottom of the container will be a liquid coffee concentrate. By pouring the water over the ground coffee and waiting a sufficient time for the water to drip entirely through the ground coffee, none of the bitter oils are present in the concentrated liquid. After the concentrate has been made in the manner described, it is poured into a bottle or other container which is tightly capped and placed in the refrigerator until ready for use. When a cup of coffee is desired, the bottle or other container is taken from the refrigerator and a small amount of the concentrated liquid is poured into a cup of water which has been brought to the boiling point, sufficient space at the top of the cup being allowed for the reception of the concentrated liquid. It is recognized that people's tastes as to the strength of coffee vary, and the present method permits the coffee drinker, by a simple experiment, to determine the quantity of the liquid concentrate necessary to satisfy his particular taste. For the average cup of coffee it has been found that this may be provided by using approximately seven parts of boiling water to one part of the ocncentrate. After the desired amount of concentrate has been poured from the bottle, the latter is capped and returned to the refrigerator. The concentrate may be stored in the refrigerator for immediate use and will keep for weeks.

The present method therefore has many advantages over the making of coffee by conventional methods. It is the practice of some people to make coffee conveniently two or more times a day, and after each use, the coffee pot must be cleaned. By the present method, a substantial quantity of concentrate may be made, thus providing instantly available coffee several times a day for many days.

BRIEF DESCRIPTION OF THE DRAWINGS

The figure represents the utensile which will be used in the practice of the present method in the sequence of their use.

DESCRIPTION OF THE PREFERRED EMBODIMENT

In the drawing, the numeral 10 designates a conventional so-called tea kettle in which water is brought to a brisk boil in the practice of the method. A container 12, similar to an ordinary percolator, but preferably substantially larger, is provided with a basket 14 of perforate construction supported by its stem 16, the lower end of which rests on the bottom of the pot 12. In the practice of the method, the desired quantity of ground coffee, preferably of the drip-grind type, is placed in the basket 14. A fraction of the boiling water is poured into the basket 14 at desired intervals of substantial length, the intervals being provided to permit the water to completely drain through the coffee before the addition of the next fractional part of the water in the kettle 10. In the preferred practice of the invention, four cups of ground coffee may be placed in the basket 14 and eight cups of water will be boiled in the kettle 10. Two cups, that is one-fourth, of the water in the kettle 10 will be poured into the basket 14 at intervals, for example, intervals of from ten to fifteen minutes and preferably about thirteen minutes. After all of the boiling water has been poured over the coffee, a liquid coffee concentrate will be present in the bottom of the coffee pot 12, whereupon the basket 14 may be cleansed.

The concentrate in the pot 12 is then poured into a bottle 18 of suitable size, the particular type of container being unimportant. The container if desired may be, for example a fruit jar and it will be tightly capped and placed in the refrigerator until ready for use. When it is desired to make a cup of coffee, a cup 20 of ordinary type may be used and the tea pot 10 with water therein will be placed on the stove and boiled. The boiling water may be first poured into the cup 20, leaving a space at the top of the cup for the concentrate. Each user, according to his own taste, may determine the quantity of the concentrate he desires to add to the cup 20. Such quantity of the concentrate is then measured into the cup. If desired, the concentrate may be first placed in the cup and the cup later filled with boiling water. The amount of concentrate in each cup is relatively small, and the addition of boiling water results in a cup of coffee which is relatively hot and palatable. The resultant coffee is free from any bitter taste, and fully equivalent in taste and aroma to coffee made by any conventional method. The resultant coffee is superior to powdered coffee, and having made a substantial quantity of the concentrate, it is as easy to make a cup of coffee by the present method as it is to use powdered coffee.

The preferred procedure has been outlined above and involves the use of approximately two times the quantity of boiling water as compared with the ground coffee. This proportion may be varied to a reasonable extent, but in any event the number of cups of boiling water will be in excess of the number of cups of ground coffee used. According to the preferred steps of the method, one-fourth of the boiling water is preferably the fractional part thereof poured over the ground coffee at the desired intervals. This also may be varied within reasonable limits. For example, one-third of the water may be poured at each interval or one-fifth of the water may be poured at each interval.

In the making of conventional coffee, for example, drip coffee, it is a practice to use about one tablespoonful of ground coffee for each cup of the resultant beverage. Thus, compared with the present method, a substantial quantity of boiling water remains in contact with the coffee grounds long enough to carry with it certain of the bitter oils in coffee. The use of a limited amount of boiling water very much reduces the time of contact of the boiling water with the ground coffee, thus reducing the carrying through of bitter oils. This effect is enhanced by pouring relatively small quantities of boiling water on the coffee at intervals, the small quantity of water poured each time passing relatively rapidly through the coffee. The essence of the coffee is carried through the grounds with the water, but the time of contact of the water with the coffee and the relatively small amount of water poured reduce the dissolving of bitter components from the coffee.

From the foregoing it will now be seen that there is herein provided an improved method of making liquid coffee concentrate which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

What is claimed is:

1. The method of making liquid coffee concentrate which comprises supporting approximately four cups of drip-grind coffee in a perforate basket, providing a container surrounding the basket with the basket spaced above the bottom of the container, boiling approximately eight cups of water, pouring approximately two-cup amounts of the boiling water over the ground coffee at approximately thirteen minute intervals sufficiently long to permit each fractional amount of water so poured to drain through the ground coffee, collecting the resultant liquid concentrate in the container as it drips from the basket, pouring the concentrate from the container into a jar, tightly capping the jar, storing the jar in a refrigerator, pouring boiling water into a cup leaving a space at the top of the cup for the concentrate, pouring a quantity of the cooled concentrate equal to one seventh of the quantity of boiling water in the cup into the cup each time a cup of coffee is to be prepared, and cleaning the basket between the step of pouring the last portion of boiling water through the ground coffee and pouring the extract from the container into the jar.

References Cited

UNITED STATES PATENTS

| 758,384 | 4/1904 | Reichert | 99—71 |
| 1,271,761 | 7/1918 | Phillips et al. | 99—71 |
| 1,428,256 | 9/1922 | Romero | 99—71 |
| 2,592,279 | 4/1952 | Heier. | |
| 2,950,973 | 8/1960 | Cameron | 99—71 |
| 3,119,695 | 1/1964 | Kahan | 99—79 |

OTHER REFERENCES

Sivetz, M.: "Coffee Processing Technology," The Avi Publishing Company, Inc., Westport, Conn., copyright 1963, vol. 2, pp. 128 and 236.

DENNIS E. TALBERT, Jr., Primary Examiner

U.S. Cl. X.R.

99—152, 192, 279